United States Patent
Strauss et al.

[11] Patent Number: 5,848,673
[45] Date of Patent: Dec. 15, 1998

[54] WEAR MONITORING APPARATUS FOR A DISC BRAKE

[75] Inventors: Wilfried Strauss, Wald-Michelbach; Hellmut Jäger, Edingen-Neckarhausen; Gerhard Haas, Schriesheim; Gunter Wetzel, Mannheim; Paul Antony, Worms, all of Germany

[73] Assignee: Perrot Bremsen GmbH, Mannheim, Germany

[21] Appl. No.: 782,941

[22] Filed: Jan. 13, 1997

[30] Foreign Application Priority Data

Jan. 11, 1996 [DE] Germany ............ 196 00 819.0

[51] Int. Cl.⁶ .................................................. F16D 66/02
[52] U.S. Cl. ........................ 188/1.11 L; 188/72.9; 188/71.9
[58] Field of Search ............. 188/1.11 W, 1.11 WE, 188/1.11 E, 71.7–71.9, 72.7–72.9; 340/454; 116/208; 73/130

[56] References Cited

U.S. PATENT DOCUMENTS

| | | | |
|---|---|---|---|
| 4,186,822 | 2/1980 | Khuntia et al. | 188/1.11 W |
| 5,035,303 | 7/1991 | Sullivan | 188/1.11 W |
| 5,088,967 | 2/1992 | Opitz et al. | 188/1.11 W |
| 5,379,867 | 1/1995 | Wacke et al. | 188/71.9 |
| 5,433,298 | 7/1995 | Antony et al. | 188/72.9 |
| 5,520,267 | 5/1996 | Giering et al. | 188/72.7 |

FOREIGN PATENT DOCUMENTS

| | | |
|---|---|---|
| 0567155 | 4/1993 | Germany. |
| 0492143 | 2/1995 | Germany. |
| 9509991 | 4/1995 | WIPO. |

Primary Examiner—Chris Schwartz
Attorney, Agent, or Firm—Jacobson, Price, Holman & Stern, PLLC

[57] ABSTRACT

A wear monitoring apparatus for a disc brake, particularly a sliding caliper disc brake, is described. The disc brake has a sliding thrust piece which receives an application force exerted by an application mechanism, and a longitudinally adjustable transmission mechanism for transmitting the application force from the sliding thrust piece to a brake pad. Longitudinal adjustment of the transmission mechanism is a function of the extent of frictional wear of the brake pad. The wear monitoring apparatus includes a sensor for monitoring the mutual relative excursion of two elements which excursion is attributable to frictional wear of the brake pad. The sensor is mounted on the sliding thrust piece and/or the transmission mechanism and determines relative excursion between the sliding thrust piece and the transmission mechanism.

8 Claims, 5 Drawing Sheets

WEAR MONITORING APPARATUS FOR A DISC BRAKE

BACKGROUND OF THE INVENTION

This invention relates to a wear monitoring apparatus for a disc brake, particularly a sliding caliper disc brake.

A disc brake of the above kind generally comprises a sliding thrust piece which receives an application force exerted by an application mechanism, and at least one longitudinally adjustable principal thrust transmission mechanism (or member) for transmitting the application force from the sliding thrust piece to at least one brake head or pad which carries out the application by being pressed against a brake rotor. Longitudinal adjustment of the transmission mechanism (or member) is a function of the extent of frictional wear of the corresponding brake pad, and a wear monitoring apparatus may be used, comprised of a sensor for determining the mutual relative excursion of two elements attributable to such frictional wear.

A wear monitoring apparatus of the type described is disclosed in Eur. Pat. App. 0,567,155. With this known apparatus, the adjustment excursion, and thereby the extent of wear, is determined by a sensor fixed to the caliper housing, which sensor engages the transmission mechanism (or member) by means of a sliding pin. Thereby, changes in the distance between the thrust shaft and the caliper housing are determined. Because the sensor is fixed to the caliper housing, the coupling between the brake components and the sensor components cannot be effected until the brake components and sensor components are mounted in the caliper housing. The same is true of the adjustment, and any calibration, of the relative positions of the thrust shaft and the sensor (or elements of the sensor). Such adjustment and/or calibration are possible only after mounting. The inability to perform adjustment, calibration, and operational testing, prior to installation, is a disadvantage.

In a sliding caliper disc brake, the phase of application and measurement is accompanied by mutual axial displacements of the caliper housing (and thereby any sensor fixed to said housing) and the thrust shaft. These relative displacements must be taken into account in any measurement.

According to Eur. OS 0,492,143, the wear is determined by means of a sensor of rotational angle, mounted in an opening at the end of the caliper housing, into which opening a part of the brake adjusting mechanism projects. The angular excursion of the brake adjusting mechanism during the brake adjustment phase is used as a parameter of the wear of the brake pad. With this arrangement, setup, calibration, and functional testing also cannot be performed prior to installation.

PCT OS no. WO 95/09991 discloses a wear monitoring apparatus comprising a sensor with a rotational potentiometer mounted on the caliper housing and coupled to a brake adjusting mechanism. Here too, the rotational movement of the relevant part of the adjusting mechanism is measurable only after installation.

SUMMARY OF THE INVENTION

It is an object of the present invention to provide a wear monitoring apparatus which can be functionally tested and with which a base setting (calibration) between the transmission mechanism (or member) and the sensor can be produced, in a simple manner and, in particular, prior to installation in the brake. Further, the wear monitoring apparatus should be insensitive to positional and tolerance deviations between the brake and the sliding thrust piece, or between the brake and the transmission mechanism (or member). Additionally, assembly should be simple and easy. In the case of a sliding caliper brake, the wear monitoring apparatus should also be insensitive to vibrations of the caliper (or caliper housing) and the direction or course of spurious or confounding displacements.

According to the invention the sensor is mounted on (or at) the sliding thrust piece and/or the transmission mechanism (or member), and the sensor determines the relative excursion between the sliding thrust piece and the transmission mechanism (or member), attributable to frictional wear.

The mounting of the sensor on the sliding thrust piece and/or the transmission mechanism (or member), so as to determine the relative excursion between said elements, allows the sensor, sliding thrust piece, and transmission mechanism to be assembled together to comprise a single subassembly, thereby enabling adjustment and functional testing prior to installation of said subassembly. The sensor measures only the relative excursion between the sliding thrust piece and the transmission mechanism (or transmission member), which excursion is attributable to frictional wear of the corresponding brake pad; accordingly, only certain relevant tolerances must be adhered to.

There is no requirement that other components of the brake meet tolerances comparable to those applied to the wear monitoring system. Overall assembly is facilitated by the fact that the sensor can be mounted and precalibrated prior to installation in the brake. Also, in the case of a sliding caliper disc brake, the sensor does not detect spurious or confounding displacements. The result is improved accuracy and easier and simpler evaluation of the sensor signal.

The longitudinally adjustable transmission mechanism (or member) according to the invention may comprise a thrust shaft.

According to a preferred embodiment, the sensor is comprised of a rotational potentiometer mounted on the sliding thrust piece, and a toothed rack or a rod, which is operatively connected to the rotational potentiometer. The rack or rod is coupled to the thrust shaft in the axial direction of the shaft, but with regard to rotation of said thrust shaft, the rack (or correspondingly the rod) is not coupled to the thrust shaft.

If the rack or rod is in the form of a toothed rack, the rotational potentiometer is provided with a toothed pinion.

The rack or rod may also be in the form of a rod which is urged against a friction wheel provided on the rotational potentiometer. The friction wheel is preferably conical (or frustoconical).

In the case of a frictional connection between the rod and the rotational potentiometer, preferably a prestressing mechanism is provided to urge the rod and the potentiometer into mutual engagement.

To facilitate, e.g., adjustment and calibration, the sensor may de-couplable from the rack or rod, according to the invention.

The invention will be described in more detail hereinbelow, with the aid of preferred embodiments and with reference to the accompanying drawings, from which description and drawings additional features and details of the invention will be apparent.

DESCRIPTION OF PREFERRED EMBODIMENTS

Figure 1:
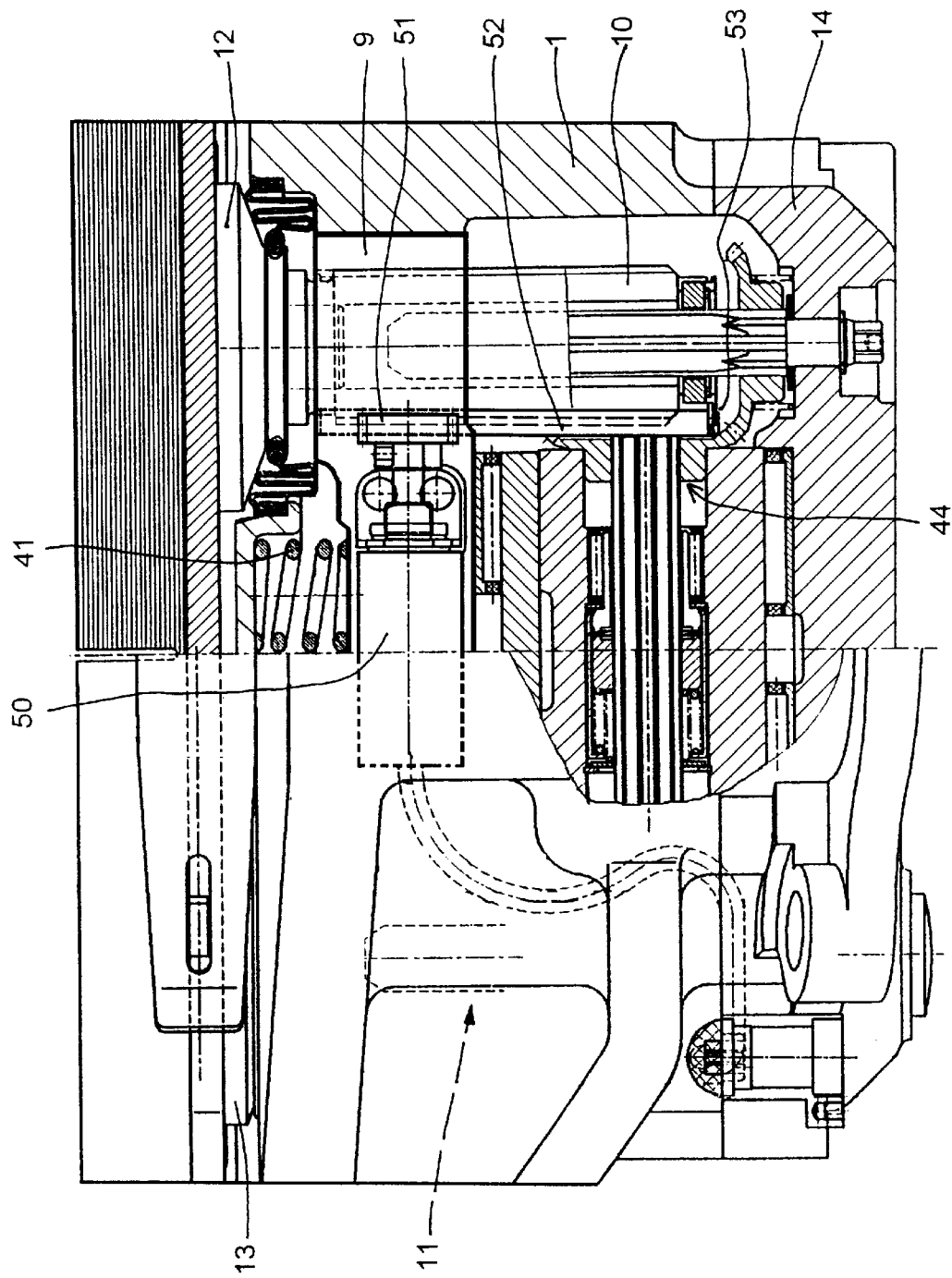
FIG. 1 is a partial cross section, perpendicular to the plane of the brake disc, through a two-shaft sliding caliper disc brake having an embodiment of the inventive wear monitoring apparatus.

According to FIGS. 1–3 and 7, the disc brake has a caliper 1 (also referred to as the "caliper housing"). The caliper has two legs which extend over the brake rotor 2 (FIG. 2) in customary fashion. On opposite sides of rotor 2, brake pads (3, 4) carried on brake pad supports 5 are guided and supported in a brake head (not shown) and ultimately in the caliper 1. The caliper 1 is also mounted (mounting means not shown) so as to be slidable perpendicularly to the disc 2, with the aid of guide elements. On one side of the rotor, the caliper 1 has an application mechanism 6 for applying thrust to the brake pads.

Figure 2:
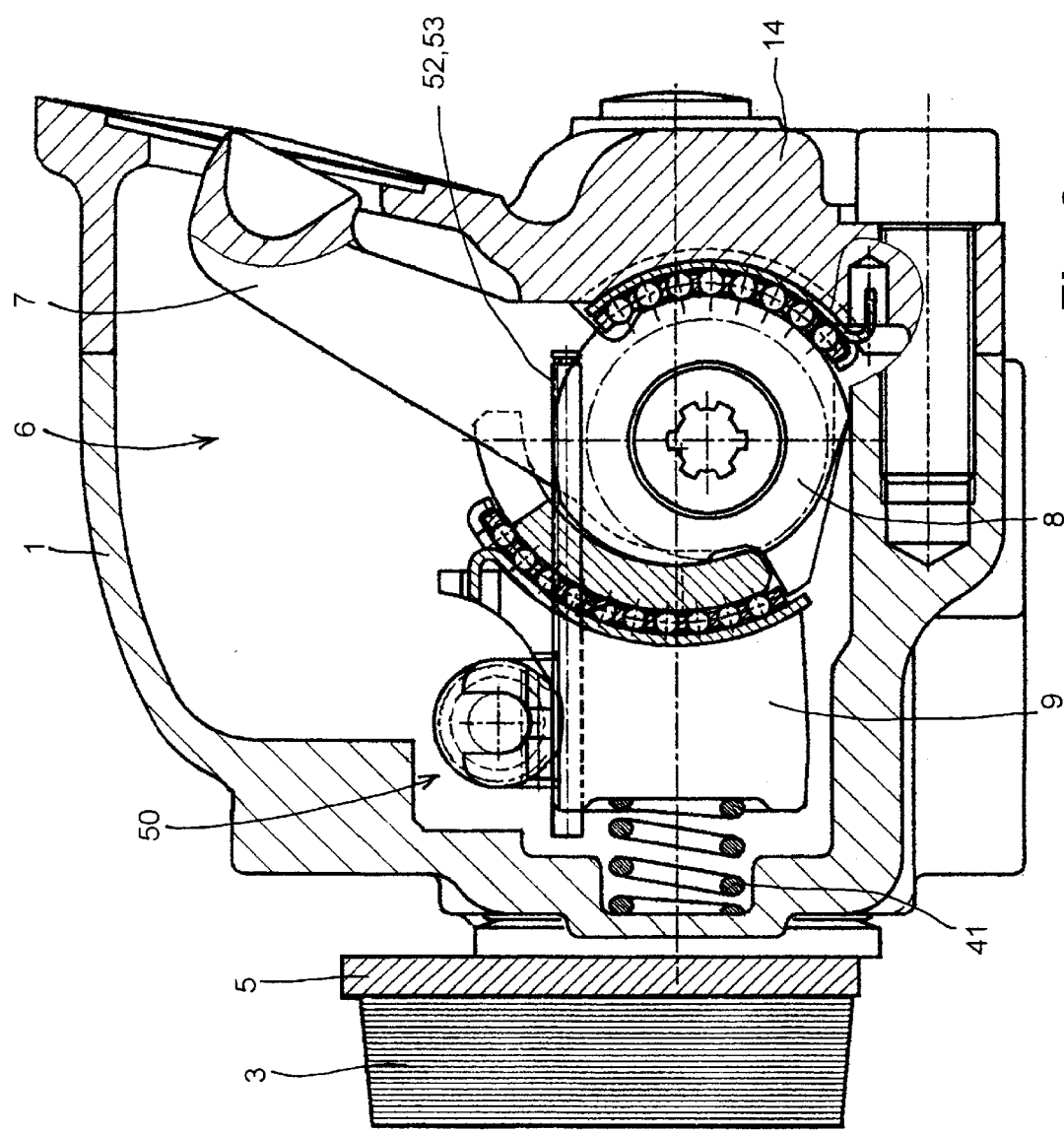
FIG. 2 is a cross section through the disc brake of FIG. 1, perpendicular both to the plane of the brake disc and to the cross section according to FIG. 1.
Figure 3:
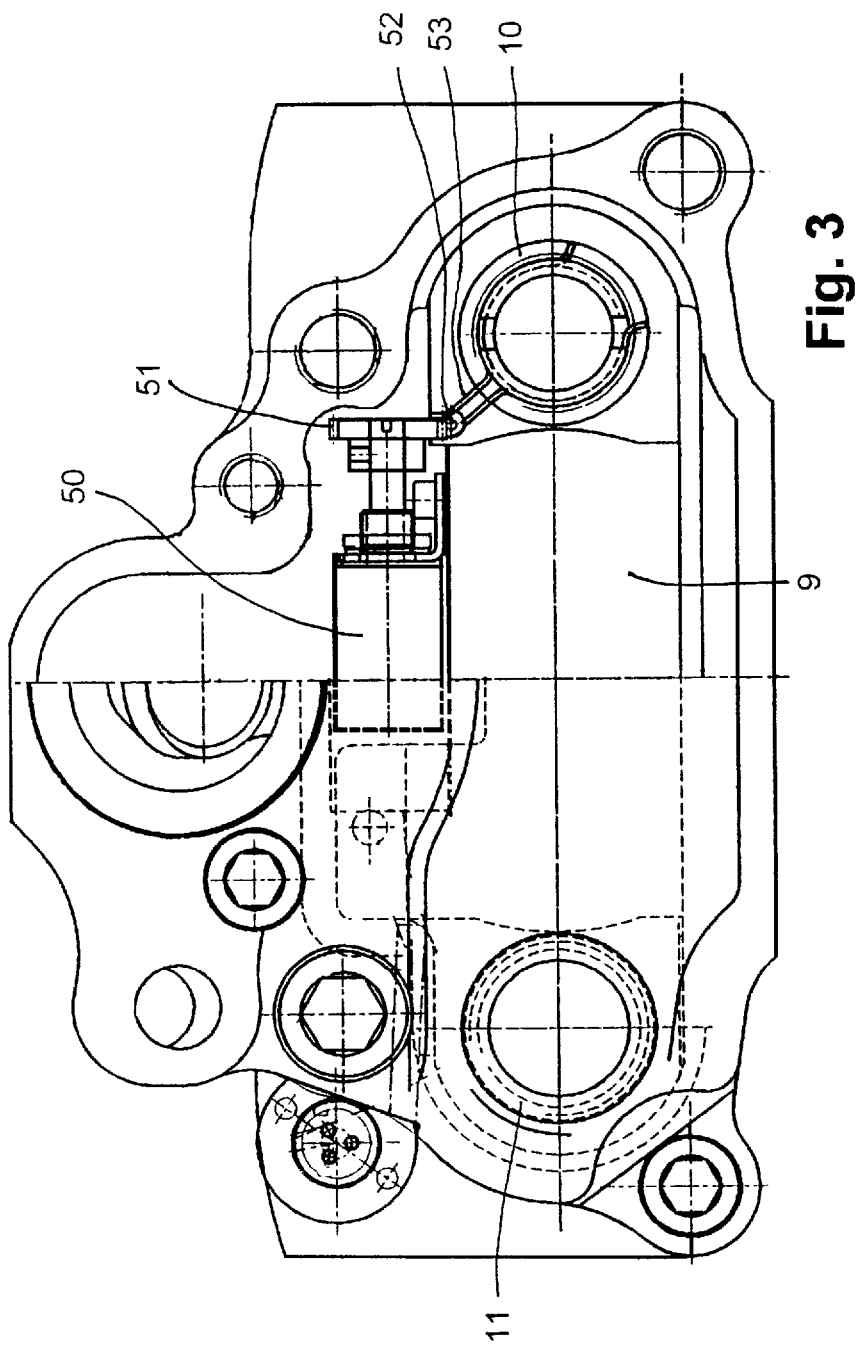
FIG. 3 is a partial cutaway view of the disc brake according to FIG. 1, in the direction of the brake disc axis.
Figure 7:
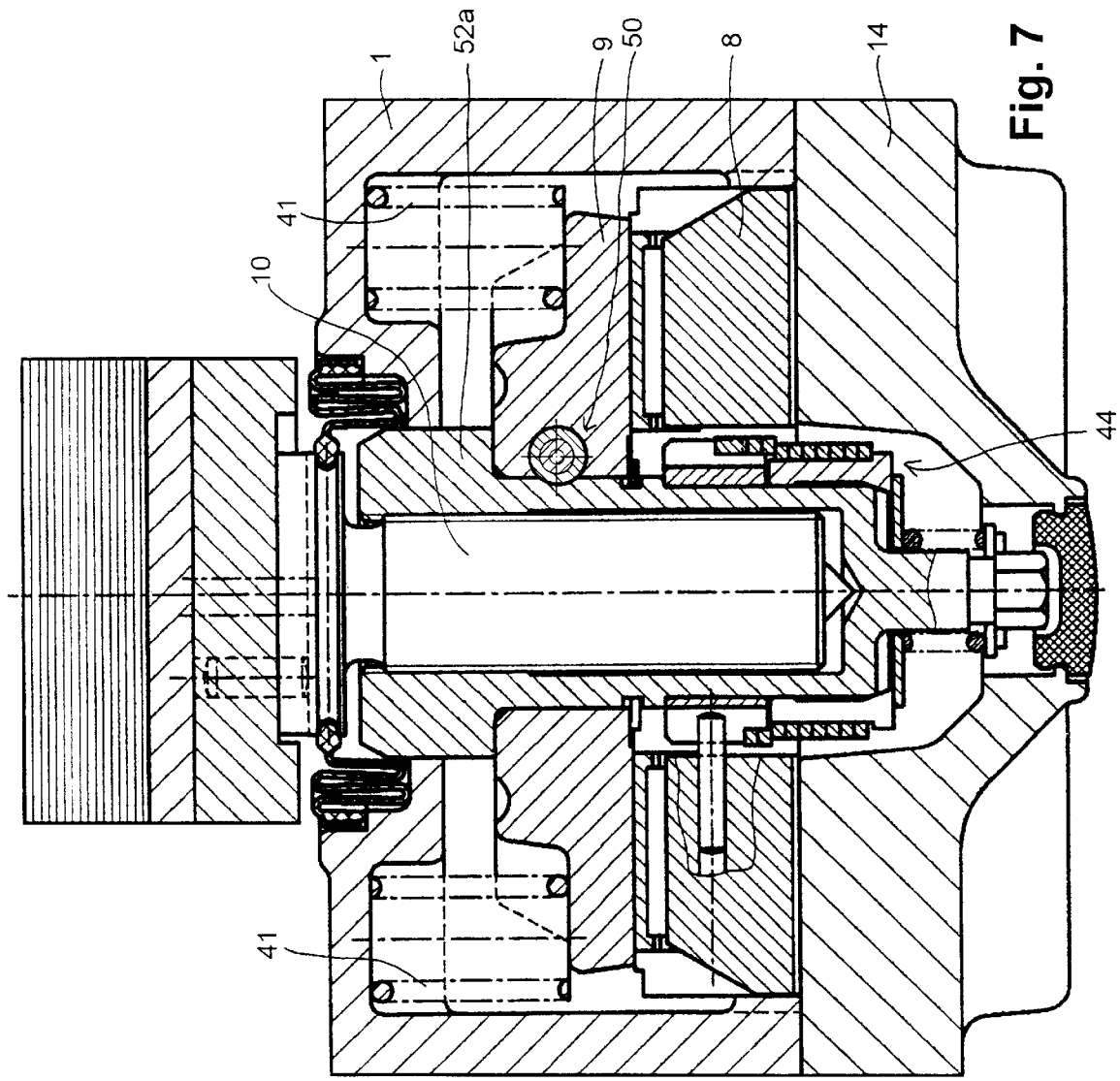
FIG. 7 is a cross section, perpendicular to the plane of the brake disc, through a one-shaft sliding caliper disc brake showing another embodiment of the inventive wear monitoring apparatus.

The application mechanism 6 is essentially comprised of brake lever 7 connected to an application shaft 8 disposed parallel to the plane of the brake rotor, and a sliding piece designated the "thrust piece" 9, which is guided and supported in the caliper housing 1 and which carries two thrust shafts (10, 11), FIGS. 1–3 on each side of the rotor, in the case of a two-shaft brake, or one thrust shaft (10) on each side of the rotor, in the case of a one-shaft brake (FIG. 7). Thrust piece 9 engages the thrust shaft(s) (10, 11) via spiral bearing means or the like. Each of the thrust shafts has a thrust head assembly (12, 13) in its region nearest to the rotor 2.

A cover 14 is attached to the caliper housing 1. Cover 14 bears a brake cylinder. At least one compression spring 41 is disposed between the caliper and the thrust piece 9, which spring 41 provides mutual compressive stressing of the brake parts.

To control the adjustment of the thrust shafts (10, 11), and the enable regularity and uniformity of adjustment, an adjustment mechanism 44 is provided inside the brake, which mechanism 44 is coupled to the application shaft 8.

In the embodiment according to FIGS. 1–3, a wear sensor 50 is attached to the thrust piece 9, which sensor 50 has a toothed pinion 51 disposed in its region near the thrust shaft. Engaging means for pinion 51, e.g. a toothed rack 52, is slidably disposed in the thrust piece 9, in a thoroughgoing opening therein. Rack 52 serves as a connecting piece which is operatively connected to the thrust shaft 10 on one side. Constraining means 53 are provided which serve to couple the rack 52 to the thrust shaft 10 with regard to movement in the axial direction of the shaft 10; but with regard to rotation of the shaft 10, rack 52 is not coupled to shaft 10. As may be seen in particular from FIG. 3, the constraining means 53 is in the form of a ring surrounding the thrust shaft 10, which ring is coupled to shaft 10 with regard to movement in the axial direction but allows free rotational movement of shaft 10 inside said ring. The pinion 51 engages the rack 52.

Figure 4:
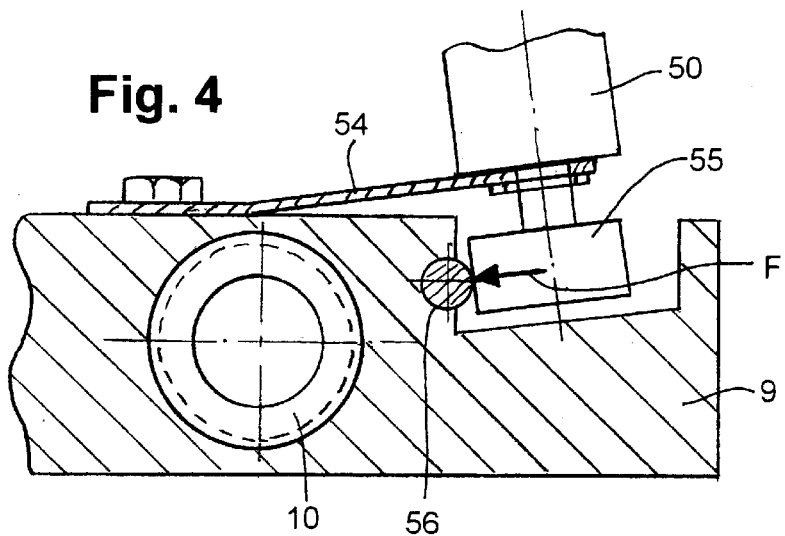
FIG. 4 is a schematic representation of a second exemplary embodiment of the inventive wear monitoring apparatus.
Figure 6:
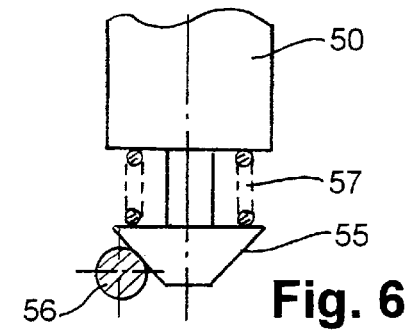
FIG. 6 is a schematic representation of an alternative embodiment of a wear monitoring apparatus according to FIG. 4.
Figure 5:
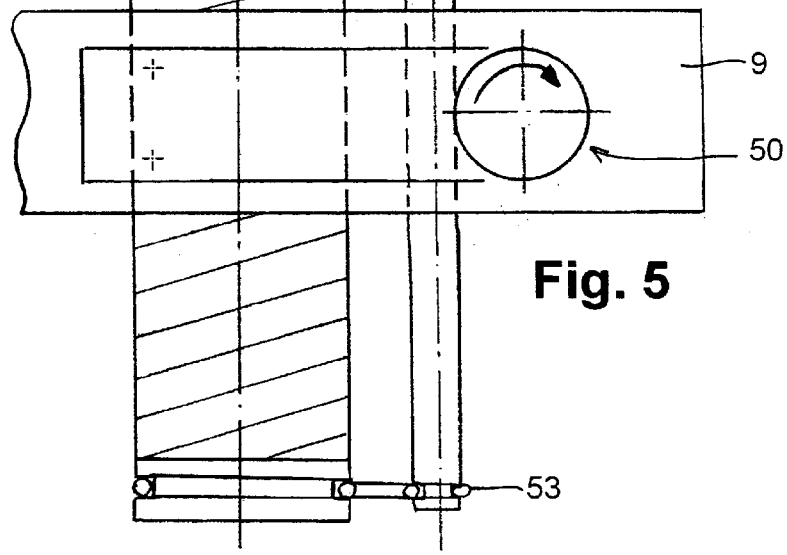
FIG. 5 is a view of the apparatus of FIG. 4, perpendicular to FIG. 4.

The exemplary embodiments illustrated in FIGS. 4–6 correspond to the embodiment of FIGS. 1–3, except that the toothed rack 52 is replaced by an un-toothed rod or the like 56, and the toothed pinion 51 is replaced by a friction wheel 55. As before, the rod 56 is operatively connected to the thrust shaft 10 via the constraining device 53. Friction wheel 55 may be cylindrical (FIG. 4) or (frusto)conical (FIG. 6). A steel spring plate 54 (FIG. 4) and/or a compression spring 57 (FIG. 6) may be employed to prestress the toothed pinion or the wheel (51, 55) against the rack or rod (52, 56), thereby providing generally play-free engagement of the frictionally contacting members.

In the embodiment according to FIG. 7 the brake has a so-called thrust bushing 52a which is interposed in the transmission of forces between the thrust piece 9 and the thrust shaft 10. With this arrangement, the sensor 50 may be mounted on the thrust piece 9 and may be provided with suitable operative connective means via which the rotation of bushing 52a relative to thrust piece 9 can be determined. This mechanism may employ toothed engagement means or friction wheel engagement means or the like. Because the extent of rotation of the thrust bushing 52a is a measure of how far the thrust shaft 10 has been screwed out, the sensor 50 will determine the adjustment excursion between the thrust shaft 10 (which is part of the transmission mechanism and the thrust piece 9 (which is in the form of a sliding element). That adjustment excursion is attributable to frictional wear on the brake pads.

In all of the embodiments described above, the individual parts can be completely pre-assembled together outside the caliper housing. The basic adjustment between the thrust shaft and the wear sensor is also easy to accomplish, as seen from the following description with emphasis on the exemplary embodiment according to FIGS. 4–6:

After thrust shaft 10 has been rotated into its initial setting, the wear sensor 50 is raised, counter to the urging of the spring (54, 57). This de-couples the friction rod 56 (or rack 52). Under these circumstances, the initial position of the sensor 50 can be adjusted. The sensor 50 is then released to allow the toothed pinion 51 or friction wheel 55 to be pressed against the rod 56 (or rack 52) by the force of the spring. The thrust shaft 10 and sensor 50 are now in their initial positions, and the system is ready for testing of the functioning of the wear monitoring apparatus.

When the brake mechanism is operated, and a corrective adjustment occurs via the brake adjusting mechanism 44 to compensate for frictional wear, the axial advance of the thrust shaft 10 with respect to the thrust piece 9 is transmitted to the operative wheel 55 (or toothed pinion 51) in the form of a rotary motion, via the connecting piece (52, 56, or 52a) which connecting piece operatively engages the thrust shaft 10. This rotary motion is measured by the sensor 50 as a parameter of the frictional wear of the brake pad.

The features of the invention disclosed in the preceding description and in the claims and drawings may be employed individually or in any desired combinations, as essential means of realizing the various possible embodiments of the invention.

| List of reference numerals: | |
| --- | --- |
| 1 | Brake caliper housing (or brake caliper) |
| 2 | Brake rotor |
| 3,4 | Brake pad |
| 5 | Brake pad support |
| 6 | Brake application mechanism |
| 7 | Brake lever |
| 8 | Application shaft |
| 9 | Sliding thrust piece |
| 10,11 | Thrust shaft |
| 12,13 | Thrust head member |
| 14 | Cover |
| 41 | Compression spring |
| 44 | Brake adjusting mechanism |
| 50 | Sensor |
| 51 | Toothed pinion |
| 52 | Toothed rack |
| 52a | Thrust bushing |
| 53 | Constraining device |
| 54 | Steel spring plate |
| 55 | Friction wheel |
| 56 | Friction rod or strip |
| 57 | Compression spring. |

We claim:

1. In a disc brake having a sliding thrust piece, an application mechanism for applying an application force to the thrust piece, and a longitudinally adjustable transmission means for transmitting the application force from the sliding thrust piece to a brake pad in a manner compensating for frictional wear of the brake pad by longitudinal adjustment of said transmission means, the improvement comprising wear monitoring means connected on one of the sliding thrust piece and the transmission means for determining relative excursion between said sliding thrust piece and said transmission means, which excursion is attributable to frictional wear of the brake pad.

2. The improvement according to claim 1, wherein the transmission means comprises a thrust shaft.

3. The improvement according to claim 2, wherein the wear monitoring means comprises a sensor having a rotational potentiometer mounted on the sliding thrust piece, and a longitudinal element comprising one of a toothed rack and a rod operatively connected to the rotational potentiometer, said longitudinal element being coupled to the thrust shaft for movement in an axial direction of the shaft, and uncoupled from said shaft for rotation of the shaft.

4. The improvement according to claim 3, wherein the longitudinal element comprises a rod which is urged against a friction wheel provided on the rotational potentiometer.

5. The improvement according to claim 4, wherein the friction wheel is in the form of a conical or frustoconical wheel.

6. The improvement according to claim 3, wherein the longitudinal element comprises a toothed rack, and the rotational potentiometer comprises a toothed pinion.

7. The improvement according to claim 3, which includes prestressing means for urging the longitudinal element and the rotational potentiometer into mutual engagement.

8. The improvement according to claim 3, including means for de-coupling the sensor from the longitudinal element.

* * * * *